Oct. 16, 1928.
A. P. STRONG
1,687,806
BEARING FOR SHAFT SUPPORTS
Filed April 24, 1925
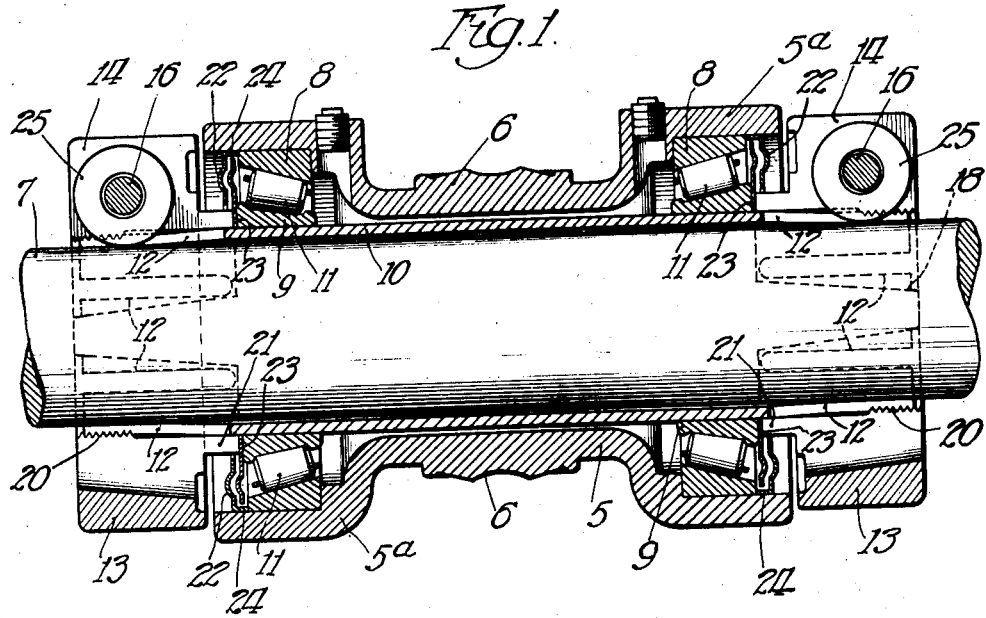
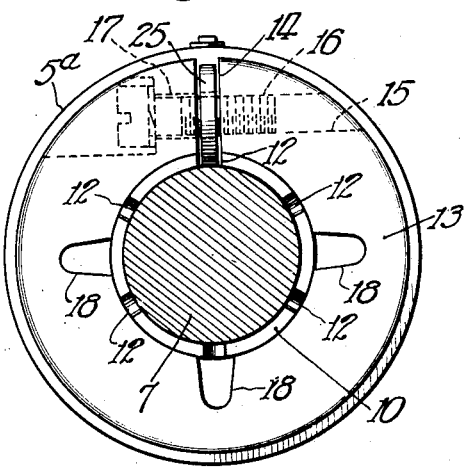
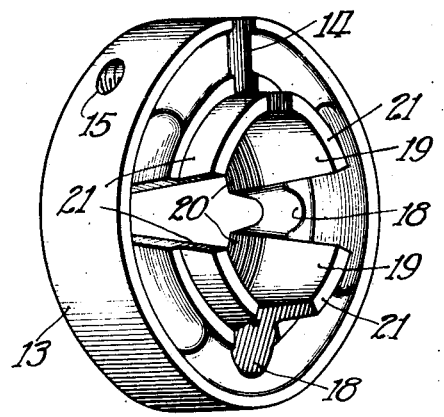
Inventor:
Arthur P. Strong
Emery, Booth, Janney & Varney Attys.

Patented Oct. 16, 1928.

1,687,806

UNITED STATES PATENT OFFICE.

ARTHUR P. STRONG, OF MISHAWAKA, INDIANA, ASSIGNOR TO DODGE MANUFACTURING CORPORATION, A CORPORATION OF DELAWARE.

BEARING FOR SHAFT SUPPORTS.

Application filed April 24, 1925. Serial No. 25,462.

This invention relates to bearings for shaft supports, for example of the type shown in the patent to William T. Burns, No. 1,524,082 issued January 27, 1925.

Among other objects, the invention aims to improve the construction and arrangement of the sleeve clamping member of the aforesaid patent and also to improve the grease seal thereof, whereby a shaft bearing is provided which is easier to install, more efficient in retaining lubricant and of enhanced serviceability.

The invention may be understood by reference to one illustrative embodiment shown in the accompanying drawings, in which:

Fig. 1 is a sectional elevation of a hanger bearing for line-shafts;

Fig. 2 is an end elevation of the same, showing the shaft in section;

Fig. 3 is a perspective view of the improved sleeve clamping member.

It is to be understood that the illustrative embodiment shown in the drawings is simply a preferred form of the invention; and that in the following explanation of that specific form, the described details of structure and organization are merely exemplary.

Referring to Fig. 1, there is shown a hanger box 5 having the usual projections 6 by which it may be adjustably secured upon a shaft hanger of standard construction. The hanger box 5 is, however, merely illustrative of numerous forms of housings which may be employed with the remaining parts of the bearing; its primary function being to house and support the two antifriction bearings on which the shaft 7 rotates.

Each end of the box 5 provides an enlarged annular chamber 5ª, in which a tapered roller bearing is held. Each roller bearing comprises an outer race or cup 8 which may be secured by a drive fit within the chamber 5ª, an inner race or cone 9 press-fitted on a carrier sleeve or tube 10 which fits over the shaft, and tapered roller bearings 11 spaced apart by the usual cage (not shown).

The carrier tube 10 is preferably of steel and has an internal diameter a few thousandths of an inch larger than the shaft to which it is designed to be fitted, so that it may be easily slipped along such a shaft. Fig. 1 exaggerates the space between the tube and the shaft. At its opposite ends, the carrier tube 10 is made contractible by a series of longitudinal slots 12 (herein six equally spaced slots, as shown in Fig. 2); and co-operating with each end of the tube is a readily contractible collar or nut 13 which, when contracted, clamps that end of the tube upon the shaft, as shown exaggerated in Fig. 1. The slots 12 do not extend as far as the portions of the carrier tube upon which the cones 9 are pressed; hence contraction of the tube will not loosen the cones 9, which therefore rotate with the shaft. It will be clear from the foregoing that the two bearings, the inner clamping tube which carries them, and the housing which encloses them, together provide a unitary structure which may be moved along a line-shaft to the desired point and then secured by the contractible collars or nuts 13.

The clamping collars 13 are split radially, as shown at 14, and have a transverse screw-threaded bore 15 on one side of said split, so that a screw 16, engaged in said bore and in a registering bore 17 and bridging the split may contract the carrier tube 10 upon the shaft, as previously described. While a collar having a single split may be contracted, at the expense of considerable labor, it has been found much easier to effect the necessary contraction of the clamping collar to insure a tight grip on the shaft, by providing a series of fractional splits or slots 18 extending radially outwardly at regular intervals from the inner surface 19 of the clamping collar. By the described construction, when the screw 16 is tightened, a series of leverages is set up which makes it possible for a mechanic to secure the bearing upon a shaft by means of an ordinary screw-driver, and without exceptional labor. Furthermore, the fractional splits permit a greater adjustment of the clamping collar than would be possible if only the single split 14 were provided, and insure a more uniform and secure gripping of the shaft.

Each clamping collar on its inner periphery 19 has screw-threads 20 to engage with similar threads on the slotted end of the carrier tube 10, as shown in Fig. 1. One face of each clamping collar also has an annular projecting portion which is divided by the slots 18 into a series of arcuate prongs 21 (Fig. 3), whose ends thrust against the adjacent cone 9 of the roller bearing when the collar is turned, for adjustment of the bearings. Such adjustment need only be made at rare intervals and then from only one end of the bearing box.

Referring to Fig. 1, the tube 10 is shown of a larger internal diameter relative to the shaft than in actual practice, to illustrate a possible function of the clamping collars. If the inner surface of the annular projecting portion 21 of each collar is of sufficient diameter when the collar is contracted, to fit snugly over the incontractible portion of tube 10 near the ends of slots 12, as shown, then the load on the shaft is transmitted through the two collars (which are of ample strength), to the incontractible portion of the tube. This arrangement of the parts may be resorted to where the load is particularly heavy and fluctuating.

To seal the hanger box 5 so that lubricant may not escape therefrom and also to prevent grit from entering the bearings, sealing means is provided at opposite ends of the box, being interposed between each bearing and the adjacent clamping collar 13. The grease seal shown is of the labyrinth type and consists of two complementary annular sheet steel members 22 and 23 (Fig. 1), the member 22 having a peripheral flange 24, and being press-fitted within the annular chamber 5ª. The grease seal member 23 preferably fits loosely over the incontractible portion of tube 10 and is of less diameter than flange 24 so that it may be received within the member 22. As shown, the projecting portion of each collar extends through the opening in grease seal member 22 and clamps the grease seal member 23 against the cone 9 of the bearing; thereupon member 23 rotates with the shaft in proper position relative to the member 22 to prevent escape of lubricant or entrance of grit. Preferably, both grease seal members are strengthened with an annular bead or corrugation; and the two beads of each seal are shown as of like dimensions and form and directly opposed to each other.

After assembling the bearings, the box and the carrier tube 10, each clamping collar is screwed upon its end of the carrier tube until the prongs 21 meet the cones 9.

The operator continues slowly screwing each clamping collar inwardly until by pulling on the collar he determines that the bearings are properly adjusted. Then to maintain that adjustment, a washer 25 is placed in the split 14 with one edge thereof entered through the nearest slot 12 of the carrier tube (Fig. 1), and the adjusting screw 16 is passed through the washer and screwed a short distance into the opposite bore 15. Thus the washer locks the clamping collar against rotation so that the adjustment of the bearings cannot be changed after the bearing box leaves the factory, unless such a change is deliberately made.

Obviously the present invention is not restricted to the particular embodiment thereof herein shown and described. Moreover, it is not indispensable that all the features of the invention be used conjointly since they may be employed advantageously in various combinations and sub-combinations as defined in the claims.

What I claim is:—

1. An anti-friction shaft bearing comprising, in combination, a housing; a tube extending therethrough; tapered roller bearings interposed between the tube and the housing; clamping collars at opposite ends of the housing; the tube being so constructed and arranged that it may be clamped to the shaft at each end by one of the collars; each collar split radially for contraction and having a series of fractional radial slots to facilitate contraction of the collar; and means bridging said split to contract the collar.

2. An anti-friction shaft bearing comprising, in combination, a housing; a tube extending therethrough; tapered roller bearings interposed between the tube and the housing; clamping collars at opposite ends of the housing; the collars and tube being so constructed and arranged that the tube may be clamped to a shaft by the collars; said collars being screw-threaded on the tube ends to adjust the roller bearings; each collar split radially for contraction and having a series of fractional radial slots extending outwardly from the inner peripheral face to facilitate such contraction.

3. A clamping collar for shaft bearings comprising an annular body which is constructed to fit over the shaft; said body being split in a plane coincident with its longitudinal axis, and having a series of auxiliary slots to facilitate contraction of the body; and a screw extending across the split and engaged with both sections of said body; the collar being of such material and its slots and split being so arranged that it may be easily contracted to the desired extent by means of an ordinary screw-driver; said collar being internally screw-threaded and having a substantially annular rib projecting from one side, near its inner periphery.

4. An anti-friction shaft bearing comprising, in combination, a housing; a tube extending therethrough; tapered roller bearings interposed between the tube and the housing with the cones of the bearings fitting the tube; clamping collars screw-threaded on opposite ends of the tube; the parts being so constructed and arranged that the collars clamp the tube at its ends upon the shaft without separation of the tube from the cones of the bearings; and a grease seal of the labyrinth type interposed between each bearing and the clamping collar and having one member thereof clamped between the cone of the bearing and the adjacent side of the clamping collar to rotate with the shaft; said clamping collar also adjusting the bearings by its thrust against one of the cones.

5. An anti-friction shaft support comprising, in combination, a housing; a tube extending therethrough; tapered roller bearings interposed between the tube and the housing with the cones of the bearings fitting the tube; clamping collars screw-threaded on opposite ends of the tube; the parts being so constructed and arranged that the tube may be clamped to the shaft by the collars without separation of the tube from the cones; and a grease seal of the labyrinth type interposed between each bearing and the clamping collar and having one member thereof annular and substantially flat, with the inner edge fitting the tube and the outer edge received within the confines of the other grease seal member, and being clamped between the cone of the bearing and the adjacent side of the clamping collar to rotate with the shaft; said clamping collar also adjusting the bearings by its thrust against the cone.

6. A bearing for shafting comprising, in combination, a housing; tapered roller bearings in opposite ends of the housing; a tube extending through the housing and secured to the inner races or cones of the roller bearings; the ends of said tube beyond the cones being contractible to grip the shaft; contractible clamping collars surrounding the contractible ends of the tube; and means for contracting each collar to cause the tube ends to grip the shaft; each collar having a portion projecting longitudinally to engage simultaneously with the cone of the adjacent bearing and with the incontractible portion of the tube, so that the load is transmitted through each collar rather than through the contractible ends of the tube.

7. A shaft hanger bearing construction comprising a hanger box, a shaft extending therethrough, a sleeve on said shaft, roller bearings interposed between said sleeve and said hanger box and locking collars for securing said sleeve to said shaft, said collars being split and having a plurality of radially extending slots around their inner peripheries.

In testimony whereof I have signed my name to this specification.

ARTHUR P. STRONG.